United States Patent
Kenney et al.

(10) Patent No.: US 8,995,588 B2
(45) Date of Patent: Mar. 31, 2015

(54) SYSTEMS AND METHODS FOR IMPLEMENTING IMPROVED FREQUENCY ESTIMATION

(71) Applicants: Thomas J. Kenney, Portland, OR (US); Eldad Perahia, Portland, OR (US); Shahrnaz Azizi, Cupertino, CA (US)

(72) Inventors: Thomas J. Kenney, Portland, OR (US); Eldad Perahia, Portland, OR (US); Shahrnaz Azizi, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 149 days.

(21) Appl. No.: 13/682,835

(22) Filed: Nov. 21, 2012

(65) Prior Publication Data

US 2013/0329815 A1 Dec. 12, 2013

Related U.S. Application Data

(60) Provisional application No. 61/658,642, filed on Jun. 12, 2012.

(51) Int. Cl.
*H04L 7/08* (2006.01)
*H04B 1/14* (2006.01)
*H04L 27/02* (2006.01)
*H04L 27/26* (2006.01)
*H04L 7/04* (2006.01)

(52) U.S. Cl.
CPC *H04B 1/14* (2013.01); *H04L 27/02* (2013.01); *H04L 27/266* (2013.01); *H04L 27/2675* (2013.01); *Y02B 60/50* (2013.01)
USPC ........... 375/344; 375/316; 370/338; 370/328; 370/310; 370/311

(58) Field of Classification Search
CPC .............. H04L 27/2675; H04L 27/266; H04L 27/2659; H04L 27/2613; H04L 69/22; H04L 7/042; H04L 2027/0065; H04L 25/0224; H04L 29/0653; H04W 80/02; H04W 84/12
USPC ........... 375/344, 315; 370/338, 328, 310, 311
See application file for complete search history.

(56) References Cited

U.S. PATENT DOCUMENTS 8,218,690 B1 * 7/2012 Zhang ........................... 375/340
(Continued)

OTHER PUBLICATIONS

Vermani, Sameer, "Preamble Format for 1 MHz", IEEE, Nov. 7, 2011, accessible at https://mentor.ieee.org/802.11/dcn/11/11-11-1482-02-00ah-preamble-format-for-1 -mhz.pptx.*
(Continued)

*Primary Examiner* — Chieh M Fan
*Assistant Examiner* — Michelle M Koeth
(74) *Attorney, Agent, or Firm* — Ellis B. Ramirez; Prass LLP (57) ABSTRACT

A system and method are provided for implementing improved frequency estimation for wireless communication that involves lower power transmissions with reduced signal-to-noise ratios for receivers particularly in systems configured according to the pending IEEE 802.11ah standard. These systems and methods provide frequency estimation over that prescribed for devices operating according other IEEE 802.11 standards and the proposed frequency estimator specified for IEEE 802.11ac systems. The disclosed techniques use schemes that reuse a short training field (STF) stored in memory, employ joint STF-long training field (LTF) estimation, use portions of a guard interval (GI), and create of multiple-phase estimates, with different symbol separation to improve a signal-to-noise ratio of the frequency estimate.

33 Claims, 5 Drawing Sheets

(56) References Cited

U.S. PATENT DOCUMENTS

| | | | |
|---|---|---|---|
| 2008/0089450 A1* | 4/2008 | Zelst et al. | 375/344 |
| 2010/0290449 A1* | 11/2010 | van Nee et al. | 370/338 |
| 2011/0134899 A1* | 6/2011 | Jones et al. | 370/338 |
| 2013/0128806 A1* | 5/2013 | Vermani et al. | 370/328 |

OTHER PUBLICATIONS

Vermani, Sameer, "Preamble Format for 1 MHz", IEEE, Nov. 7, 2011, accessible at https://mentor, ieee.org/802.11/dcn/11/11-11-1482-02-00ah-preamble-format-for-1 -m hz.pptx.*

* cited by examiner

SYSTEMS AND METHODS FOR IMPLEMENTING IMPROVED FREQUENCY ESTIMATION

BACKGROUND

1. Field of the Disclosed Embodiments

This disclosure relates to systems and methods for implementing improved frequency estimation for wireless communications in support of a broader set of use cases including outdoor use cases and use cases that involve lower power transmissions with reduced signal-to-noise ratios for receivers particularly in systems configured according to the pending IEEE 802.11ah standard.

2. Related Art

The Institute of Electrical and Electronics Engineers (IEEE) 802.11 standards are a set of standards and revisions of those standards for implementing wireless local area network (WLAN) or Wi-Fi communications, principally in the unlicensed 2.4 and 5 GHz frequency bands. IEEE 802.11 standard communications are often broadly characterized as encompassing a series of half-duplex over-the-air modulation techniques, all of which employ a same basic protocol. The original version of the IEEE 802.11 standard was released in 1997, but has been superseded by later versions that have re-defined and/or clarified these wireless communications standards. The later versions address evolution of the particular wireless communication implementations and use cases covered by the expanding use of the designated portions for the unlicensed communication spectrum.

Arguably, the most well known and prolific versions of the standards to date are the IEEE 802.11b (released September 1999), 802.11g (released June 2003) and 802.11n (released October 2009) standards, each of which is an amendment to the original standard. The IEEE 802.11b and IEEE 802.11g standards are directed to devices that use the 2.4 GHz band, while the IEEE 802.11n standard, which improves upon the previous 802.11 standards by adding multiple-input multiple-output antennas (MIMO), operates on both the 2.4 GHz and the lesser used 5 GHz bands. The IEEE 802.11ac (Pending, draft released November 2011) standard is a next generation wireless computer networking standard in the IEEE 802.11 series. The IEEE 802.11ac standard is currently under development and is expected to provide standards for systems and devices that support high-throughput WLAN communications in the 5 GHz band. The pending IEEE 802.11ac standard is anticipated to enable multi-station WLAN throughput of at least 1 Gb/sec, with improvements over IEEE 802.11n.

WLAN or Wi-Fi communications and use cases for those communications continue to evolve. The use cases and environments for those communications are broadening tremendously from the original home/office or wireless hotspot Internet access to additional use cases that include communications that support high volume entertainment streaming to communications with myriad sensor networks. This last use case poses some unique challenges in meeting certain unique requirements. In order to address these unique aspects, another IEEE 802.11 standard, IEEE 802.11ah (Pending) is separately under development.

As indicated above, WLAN and Wi-Fi communications are well standardized for the 2.4 and 5 GHz frequency ranges. There are, however, some number of non-standard modified WLAN and Wi-Fi devices available that are configured to operate in a sub-1 GHz frequency range. Vendors often take the core technology and change the frequencies at which the devices operate. A demand for such devices has emerged, in part from the smart grid community, to link to smart meters because of the potential for greater range outdoor communications for a same power out with lower obstruction losses, or alternatively to maintain communications ranges indoor with lower power transmitters associated with, for example, arrays of indoor sensors. In an effort to combat a lack of interoperability with each vendor providing its own proprietary implementation, potentially tying groups of smart grid customers separately to individual vendor implementations, the IEEE commenced the efforts to amend the 802.11 standard to include sub 1 GHz operations. These efforts on the part of the IEEE are consolidated in a Working Group developing the new IEEE 802.11ah standard. This standard will, among other objectives, establish standard RF channel widths and center frequencies for the sub 1 GHz frequency operations and devices. The IEEE 802.11ah standard is being crafted to accommodate ultra-low-power specification devices operating in the sub-1 GHz range, which would imply a much wider range than the 2.4-GHz IEEE 802.11n or 5.0-GHz IEEE 802.11ac technologies.

The IEEE 802.11ah standard systems are being developed to reuse, as much as possible, the IEEE 802.11ac system design. As the specifics of the IEEE 802.11ah standard emerge, it becomes clear that systems operating according to the IEEE 802.11ah standard will employ bandwidths including a new 1 MHz bandwidth that will uniquely supplement a set of down-clocked IEEE 802.11ac standard rates, namely 2, 4, 8 and 16 MHz, where the down-clocking is 10×. The 1 MHz rate is not derived from the IEEE 802.11n or IEEE 802.11ac standard rates. Thus, the 1 MHz bandwidth mode is being designed relatively independently. The 1 MHz system is anticipated to use a new 32 point Fast Fourier Transform (FFT), as opposed to the minimum 64 point FFT used in the IEEE 802.11ac standard. The 2, 4, 8 and 16 MHz bandwidths will have a preamble structure like that of the IEEE 802.11ac standard. The 1 MHz system of the IEEE 802.11ah standard will use a similar preamble structure, but will include repetition in the preamble to allow the 1 MHz system to reach further in range, or to operate at lower power.

BRIEF DESCRIPTION OF THE DRAWINGS

Various exemplary embodiments of the disclosed systems and methods for implementing improved frequency estimation for wireless communications in support of extended range outdoor transmissions and lower power indoor transmissions, each with reduced signal-to-noise ratios for receivers particularly in systems configured according to the pending IEEE 802.11ah standard will be described, in detail, with reference to the following drawings, in which.

DETAILED DESCRIPTION OF THE DISCLOSED EMBODIMENTS

The disclosed systems and methods for implementing improved frequency estimation for wireless communications in support of extended range outdoor transmissions and lower power indoor transmissions, with reduced signal-to-noise ratios for receivers, particularly in systems configured according to the pending IEEE 802.11ah standard will generally refer to this specific utility for those systems and methods. Exemplary embodiments described and depicted in this disclosure should not be interpreted as being specifically limited to applicability to any particular IEEE 802.11 standard, as they may find applicability in implementations of at least the IEEE 802.11ac standard in addition to applicability in implementations of the IEEE 802.11ah standard.

Figure 1:
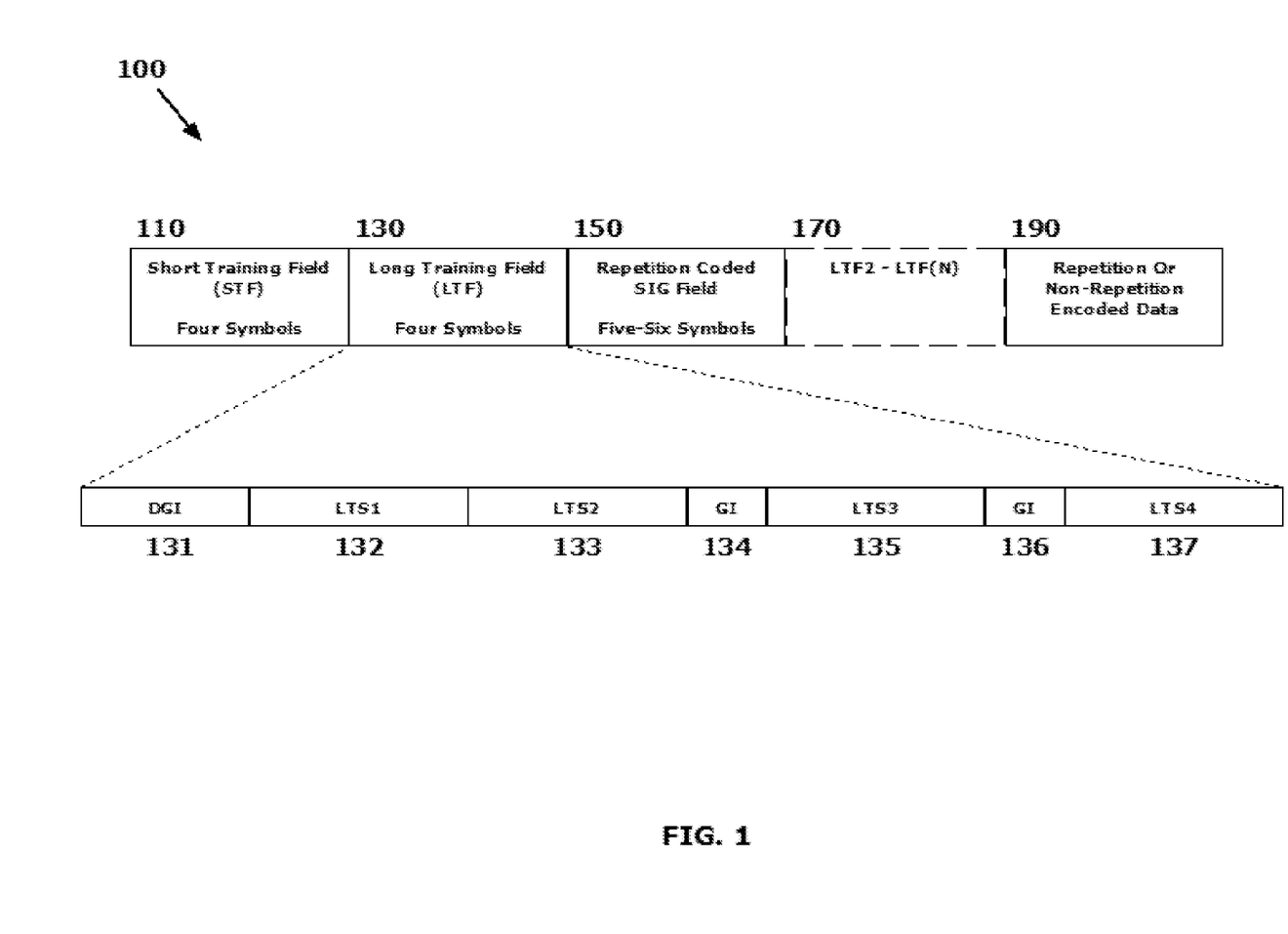
FIG. 1 illustrates an exemplary packet preamble structure as discussed in this disclosure.

For ease of depiction and description, this disclosure will focus on the packet structure for the IEEE 802.11ah standard 1 MHz system, as shown in FIG. 1, which is described in some detail below.

Specific reference, for example, to any particular wireless device, whether generally static or mobile, should be understood as being exemplary only, and not limited, in any manner, to any particular class of wireless devices, transmitters or receivers. The systems and methods according to this disclosure will be described as being particularly adaptable to wireless low power transmitter and receiver devices for use in certain multiple sensor applications. This exemplary adaptation for the systems and methods according to this disclosure is intended to be exemplary only, and in no way limiting to the disclosed subject matter. Exemplary embodiments according to this disclosure may find equal applicability to outdoor applications where the power of the transmitter is not reduced, but a range for the communications may be extended.

Individual features and advantages of the disclosed systems and methods will be set forth in the description that follows, and will be, in part, obvious from the description, or may be learned by practice of the features described in this disclosure. The features and advantages of the systems and methods according to this disclosure may be realized and obtained by means of the individual elements, and combinations of those elements, as particularly pointed out in the appended claims. While specific implementations are discussed, it should be understood that this is done for illustration purposes only. A person skilled in the relevant art will recognize that other components and configurations may be used without departing from the spirit and scope of the subject matter of this disclosure.

In systems according to the proposed IEEE 802.11ac and IEEE 802.11ah standards, reliable initial signal acquisition may be a critical element in establishing and/or ensuring a quality communication link. This initial acquisition is recognized by those of skill in the art as needing to be increasingly precise, and therefore becoming more difficult, when these standards are implemented in systems having varied use cases, bandwidths, and carrier frequencies according to specific operational environments. For instance, in the IEEE 802.11ac standard systems using multi-user MIMO, the performance of the initial acquisition and tracking can dictate the performance for not only a single device, but for all devices in the multi-user MIMO transmission scheme. For example, if the channel estimate is degraded due to poor parameter estimation, including frequency estimation, a computation of transmitter weights at a wireless access point may be off due to the error and thus affect the entirety of the multi-user MIMO transmissions via the access point. Systems developed to conform to the IEEE 802.11ah standard may, for example, need to operate with a channel having a much higher Doppler component than those employed in systems according to earlier standards. Additionally, the IEEE 802.11ah standard system in the 1 MHz mode will operate with potentially very low signal-to-noise ratios when compared to systems according to other standards.

In anticipating operating of the IEEE 802.11ah systems in the new channel models and with low signal-to-noise ratio levels, it was postulated that current frequency estimators, such as those used in legacy systems, may not be sufficient to meet the broad set of use cases and operating conditions. In fact, as the standards development process for the IEEE 802.11ah standard proceeds, the frequency estimator is garnering particular attention as potentially the weakest link in the receiver, dictating performance for long packets particularly in outdoor channels.

For brevity, the following discussion of the disclosed systems and methods for improved frequency estimation will reference, almost exclusively, application to devices operating according to the IEEE 802.11ah standard. The disclosed systems, methods, techniques and schemes, as indicated above, may find applicability in devices operating according to at least the IEEE 802.11ac standard. This can produce the advantage of requiring only a single algorithm based on a precision threshold established by the IEEE 802.11ah standard, but limit other processing for portions of a system that may operate according to the other standard.

As noted, IEEE 802.11ah standard systems offer several bandwidths of operation. The first of these bandwidths are a set of down-clocked versions of the IEEE 802.11ac bandwidths, where the down-clocking rate is 10 times. An additional bandwidth of 1 MHz is provided. Due to the unique nature of this latter implementation, the discussion below will focus on this bandwidth.

Exemplary embodiments of the disclosed systems and methods may provide a unique solution by which to effect greatly improved frequency estimation over that which is currently prescribed for devices operating according to others of the IEEE 802.11 standards, including and particularly the frequency estimator currently used in systems operated according to the IEEE 802.11n standards, and the proposed frequency estimator specified for IEEE 802.11ac systems.

Exemplary embodiments may employ the following techniques to facilitate the disclosed improved frequency estimation schemes: (1) reuse of a short training field (STF) (stored in memory); (2) joint STF-long training field (LTF) estimation; (3) use of portions of a guard interval (GI); and/or (4) creation of multiple-phase estimates, with different symbol separation to improve a signal-to-noise ratio of the frequency estimate.

In the proposed IEEE 802.11ah standard, an exemplary packet structure 100 may be used that includes elements such as those shown in FIG. 1. As shown in FIG. 1, the preamble structure for the packet may include an STF 110 and an LTF1 130, followed by a Repetition Coded Signal (SIG) Field 150, which may be followed by various other fields 170,190 for additional training and/or as other signal fields and the like. Exemplary additional fields are illustrated in FIG. 1 as additional long training fields (LTF2-LTF(N)) 170, which may be particularly usable in MIMO communications and Repetition and/or Non-Repetition Coded Data 190. Those skilled in the art will recognize that many and widely varied configurations may be applicable to these additional fields.

Issues arose in consideration of the IEEE 802.11ah standard systems for situations involving comparatively very low data rate systems. For comparison, in the pending IEEE 802.11ac standard, a lowest achievable data rate may be on the order of 65 Mb per second, while in communications according to the proposed IEEE 802.11ah standard, may achieve a lowest potential data rate on the order of 150 kb per second. The difference is predicated on the use cases to which the IEEE 802.11ah standard is directed, many involving narrower bandwidths for implementations in, for example, multiple low power sensors, which are envisioned to include low power, low cost wireless transmission devices and/or components. In one use case, many such sensors may be located in a structure, such as a residential structure, and multiple independent paths for localized communications may need to be established with relatively large numbers of such sensors, which may be located close to one another.

While unique in certain respects, including that the IEEE 802.11ah standard provides a 1 MHz low bandwidth, low power mode, the IEEE 802.11ah packet structure, in essence, copies a packet structure that was available in other versions of the IEEE 802.11 standards. This is done for, among other reasons, compatibility and ease of implementation. In IEEE 802.11ah, however, the preamble itself is repeated in a manner that achieves more processing gain in order, for example, to improve a signal-to-noise ratio at a receiver by integrating longer. In other words, although the devices will transmit on a lower power, the signals, which are transmitted at that lower power may be improved upon by transmitting a same low power signal for a longer duration and integrating longer to improve a signal-to-noise ratio. With these systems, a same communication distance may be achievable with lower power transmitters by improving the signal-to-noise ratio at the receiver.

An achievable communicating distance, or reach, is generally understood to be a product of a power output from the transmitter, and a signal-to-noise ratio of the receiver. Consider the case where, for a particular wireless system, the transmitter transmits with an output power P. As the transmit power is reduced, for example, cut in half (the resulting output power being P/2), then generally to maintain the same fidelity of reception (to maintain the connection), a distance between the transmitter and the receiver needs to be cut in half as well. In order to attempt to overcome this, and maintain a same transmission distance for a lower power transmission, a training field may be sent for twice as long, resulting in twice the energy being transmitted and the integration taking place over a longer period of time lowering the signal-to-noise ratio of the receiver based on these training fields and allowing for a same communication distance to be achieved when a power out of the transmitter is cut from P to P/2. This is reflected in the sample IEEE 802.11ah preamble shown in FIG. 1 in which training fields (STF and LTF) having four symbols are twice as long as the training fields in the IEEE 802.11n and IEEE 802.11ac standard systems. Separately, in instances in which the power P out of the transmitter is held constant, the training field being sent for twice as long may allow for increased communication distances to be achieved. By using the repetition of the preamble according to the disclosed schemes, extended communications ranges are achievable for a same power out, the extent of the increase being a function of the environment.

Those of skill in the art recognize that it is, however, not the case that simply because the training fields are being sent for a longer period of time that the distances will be maintained based on this integration alone. What are required are commensurate additional methods for accomplishing frequency estimation, and/or detection of an actual packet, among other issues.

It would be advantageous to aid in the process for maintaining the transmission distance with regard to lower output transmitters to exploit the capabilities whereby a training field may be sent for twice as long and thereby integrated over a longer period of time to reduce the signal-to-noise ratio at the receiver.

Exemplary embodiments may provide for improved frequency estimation in lower power systems in support of implementation of the IEEE 802.11ah standard for low power transmissions in a manner that maintains comparable communication distances to those achievable in higher power systems.

These and other features, and advantages, of the disclosed systems and methods are described in, or apparent from, the following detailed description of various exemplary embodiments.

In current IEEE 802.11n standard implementations and in the proposed IEEE 802.11ac standard implementations, the frequency estimator is implemented over two packet portions, the STF and then LTF. In these standards, the STF is 2 symbols and the LTF is 2 symbols (restricting this discussion to 1-stream operation for simplicity). In the IEEE 802.11 standard systems, the first portion of the STF is commonly used to detect the packet (and to provide some coarse timing), and aids in settling an Automatic Gain Control (AGC) loop, along with providing other initial parameter estimates. One of these initial parameter estimates is the frequency estimation. Coarse frequency estimation is done using the STF. An objective of this initial estimation step is to resolve a coarse frequency error outside a capture range of the LTF. The design of the STF may allow the receiver to estimate frequency offsets larger than those which could be detected using the LTF sequence alone. The STF estimate may be used to initialize a frequency loop by applying the estimate to the carrier. In a next training step, the LTF may be used to make another fine estimate after the initial STF estimate. Exemplary embodiments may use a certain portion of the STF for AGC settling and packet detection. The amount of time will depend on implementation.

Referring to FIG. 1, the sequence used to create the STF 110 may use, for example, six of the twenty-four available carriers. A 32 point FFT may create a time domain sequence with a pattern that repeats four times. In the 1 MHz implementation of IEEE 802.11ah, this sequence may then be repeated to fill out a total of four orthogonal frequency-division multiplexing (OFDM) symbols. This results in a total of twenty repetitions of the STF sequence. For IEEE 802.11ac and other IEEE 802.11ah bandwidths, there are conventionally ten repetitions.

As seen in FIG. 1, the LTF1 130 in IEEE 802.11ah 1 MHz may advantageously employ four symbols. The four symbols may be arranged to have a partially periodic structure as follows. The first two symbols may collectively consist of a double guard interval (DGI) 131 followed by two Long Training Sequences (LTS) 132,133, and then two identical symbols each made up of a guard interval (GI) 134,136 of a quarter length followed by a respective LTS 135,137.

The proposed estimation scheme may employ the three major new elements discussed above. The first element may be to use a portion of the STF 110 to aid in the final, fine frequency estimate typically done only by the LTF, in this case LTF1 130. As is effected in previous versions of the IEEE 802.11 standards, a portion of the STF 110, after receiver convergence, may be used to make an initial frequency estimate. In the illustrated example, the frequency estimate may be made using a phase detector according to the following equation:

$$D_{STS}(n) = y_l^*(n) y_l(n-N) \qquad \text{Equation 1}$$

where y(n) is a vector of length l, containing one sequence of the twenty STF sequences. Additionally, N is an offset in the sequences, which may range from 1 to 19.

It should be recognized that the disclosed schemes do not choose, and are not limited to, any particular phase detector or method. Rather, the disclosed schemes are applicable to any phase detector.

Using the phase information, the frequency may be estimated, for example, according to the following equation:

$$F = \angle \text{Mean}(D_{STS}(n)) * S_r / (2\pi N l) \qquad \text{Equation 2}$$

where $S_r$ is the sampling rate.

An issue is how to best employ the frequency estimations according to the multiple symbols, i.e., are all or some of the estimates simply added together, is this step done before computing angles or after computing angles. The disclosed schemes broadly encompass all of these options in describing a particular exemplary scheme. The disclosed scheme has been evaluated as providing potentially the most gains as an optimal combination of all factors that may be routinely implemented by users in comparison to conventional methods.

Once the frequency estimate is made, the automatic frequency control (AFC) loop may be updated so that a remainder of the received signal may be compensated according to the frequency estimate. In a first step of the disclosed scheme, the data for the STF that was used to make the original estimate may be stored to memory while being received. This stored STF data may then be updated with the original estimate to arrive at an updated estimate that may later be combined with the estimates using the LTF.

Next, the LTF is operated on to attain an improved frequency estimate. As a note, the LTF is also used for estimation of other receiver parameters, but the discussion herein is just for frequency estimation. The uniqueness in the LTF1 130 shown in FIG. 1 is that the LTF1 130 has a partially periodic structure. The disclosed system may include such an LTF for compatibility reasons. In this approach, the frequency estimation error may be improved by providing, for example, an improved estimation scheme signal-to-noise ratio by employing a portion of the GI from each GI in the estimation scheme. The amount of a GI that may be used is a function of the system. For example, for systems according to the IEEE 802.11ah standard, with long symbols, more of the GI may be used than in systems according to the IEEE 802.11ac standard. According to the exemplary disclosed schemes, half of the GI may be used for an IEEE 802.11ah standard 1 MHz system, which is $N_{FFT}/8$, where $N_{FFT}$ is the FFT length.

In any estimator, a phase is computed. A sample is taken at one point in time and a sample is taken at another point in time and a phase difference is computed. An amount of phase rotation is compared to an elapsed time and a frequency can be computed, i.e., the signal is being rotated at a particular frequency. There is some loss, however, in that phase computation is linear and frequency determination relies on an angle function.

In conventional frequency estimation schemes, the phase detector typically used the LTS, without the GI and made computations similar to those in the STF case discussed above according to Equation 1 where for the LTS, the length l of the y vector is $N_{FFT}$.

In the disclosed scheme, the phase detector now is given by the following equation:

$$D(n) = y^*_{l+Nffts/8}(n) y_{l+Nffts/8}(n-N) \qquad \text{Equation 3}$$

which is intended to denote that the vector is $N_{FFT} + N_{FFT}/8 = 9/8 N_{FFT}$ to account for the inclusion of a portion of the guard interval.

Next, with reference to FIG. 1, the partially periodic structure of the component elements comprising LTF1 130 requires special handling when undertaking frequency estimation. One approach may be to use several phase detectors and add them both coherently and non-coherently. Based on this partially periodic structure, a phase rotation across this structure will be non-uniform. Because in making frequency estimates, the phase detectors need to operate on the same symbol length and offsets, the different LTS phases cannot be added directly. Thus, the symbols that have a same symbol spacing may be added coherently and a frequency estimate is made. Doing this creates up to five separate frequency estimates. These five separate frequency estimates may then be added non-coherently, e.g., after the angle operation, to arrive at a final frequency estimate.

For clarity, it should be understood that this difference in structure is introduced in order, for example, to allow the IEEE 802.11ah standard 1 Mhz system structures to coexist with, and to be discriminated from, other local systems. Consider a case where a 2 Mhz system and a 1 Mhz system are located in close proximity and activated at a same time. A mechanism may be appropriate by which to discriminate between these systems and to locate these systems for communication. The disclosed schemes, therefore, introduce a modification of the structure that still aligns with conventional schemes in favor of discrimination, yet coexistence. The deviations encumber the conventional schemes in a manner that meets these objectives without adding unnecessarily over-complicating deviations. The disclosed schemes may thus remain applicable to applications under others of the standards, including the IEEE 802.11ac standard, and may obviate a requirement for separate algorithms for application to the differing standards. The efficacy of a single algorithm may include that a single processing scheme may be provided in a communication device that includes one or more radios that may be operated according to the different standards based on a detection of transmissions and an availability of different communication paths.

Further to the disclosed scheme, the STF frequency estimate that was made on the rotated saved data may be added coherently to one of the LTF estimates. The estimates for the 1 MHz 802.11ah system may be shown as follows for the structure illustrated in FIG. 1. A first frequency estimate maybe made up of a phase detector output using LTS1 and LTS2, in addition to the phase detector output of the STF, which also had the same symbol spacing. A second frequency estimate may use LTS2, LTS3 and LTS4, where LTS1 may be assumed to be the GI for LTS2, so a portion of the LTS1 will be used as the GI. A third frequency estimate may use LTS1 and LTS3. A fourth frequency estimate may use LTS2 and LTS4. And a fifth frequency estimate may use LTS1 and LTS4. With these varying configurations and individual estimates, a total frequency estimate may be given as:

$$F_1 = \angle \text{Mean}(D_{LTS1\_2} + D_{STF}) * S_r / (2\pi N_{FFT}) \qquad \text{Equation 4}$$

$$F_2 = \angle \text{Mean}(D_{LTS2\_3} + D_{LTS3\_4}) * S_r / \{(2\pi(N_{FFT} + N_{FFT}/4))\} \qquad \text{Equation 5}$$

$$F_3 = \angle \text{Mean}(D_{LTS1\_3}) * S_r / \{(2\pi(2N_{FFT} + N_{FFT}/4))\} \qquad \text{Equation 6}$$

$$F_4 = \angle \text{Mean}(D_{LTS2\_4}) * S_r / \{(2\pi(N_{FFT} + N_{FFT}/2))\} \qquad \text{Equation 7}$$

$$F_5 = \angle \text{Mean}(D_{LTS1\_4}) * S_r / \{(2\pi(2N_{FFT} + N_{FFT}/2))\} \qquad \text{Equation 8}$$

$$F_{final} = (F_1 + F_2 + F_3 + F_4 + F_5)/5 \qquad \text{Equation 9}$$

Figure 2:
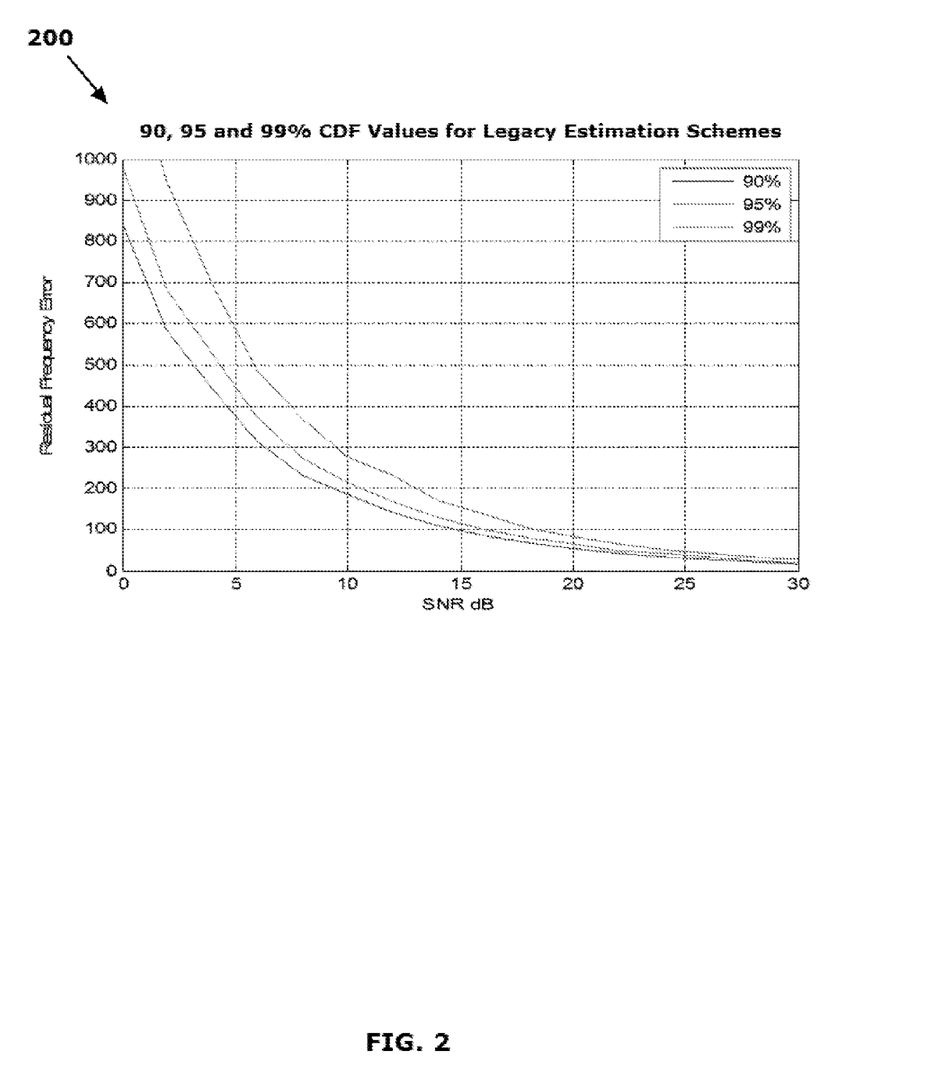
FIG. 2 illustrates cumulative distribution function (CDF) values for a legacy frequency estimator.
Figure 3:
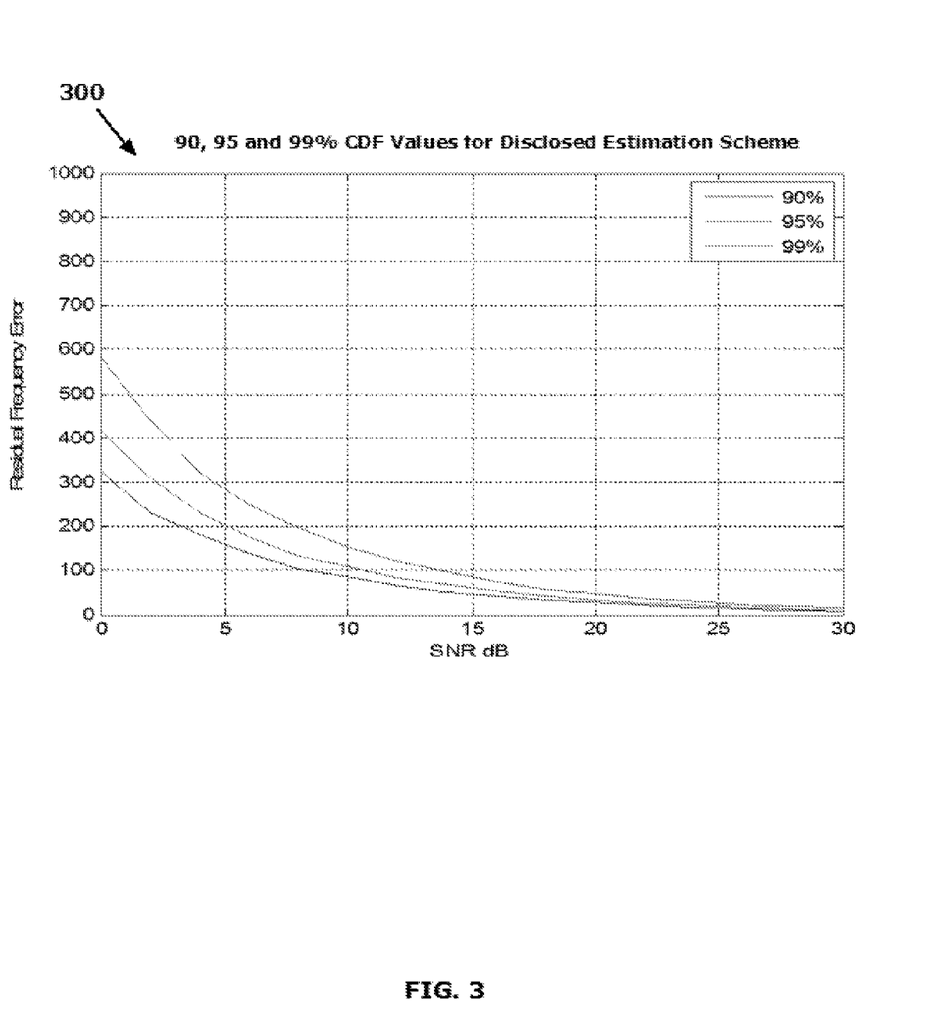
FIG. 3 illustrates CDF values for a frequency estimator employing a frequency estimation scheme according to this disclosure.

An exemplary performance improvement according to the disclosed method may be seen by comparing FIGS. 2 and 3. FIG. 2 illustrates cumulative distribution function (CDF) values for a legacy frequency estimator. FIG. 2 illustrates plots of values based on application of a conventional IEEE 802.11ac frequency estimation approach applied to a modeled IEEE 802.11ah standard system. FIG. 3 illustrates CDF values for a frequency estimator employing a frequency estimation scheme according to this disclosure. FIG. 3 illustrates plots of values based on application of the disclosed method according to the above-described three new steps. As can be seen, an exemplary improvement may be nearly three times over the previous approach.

Figure 4:
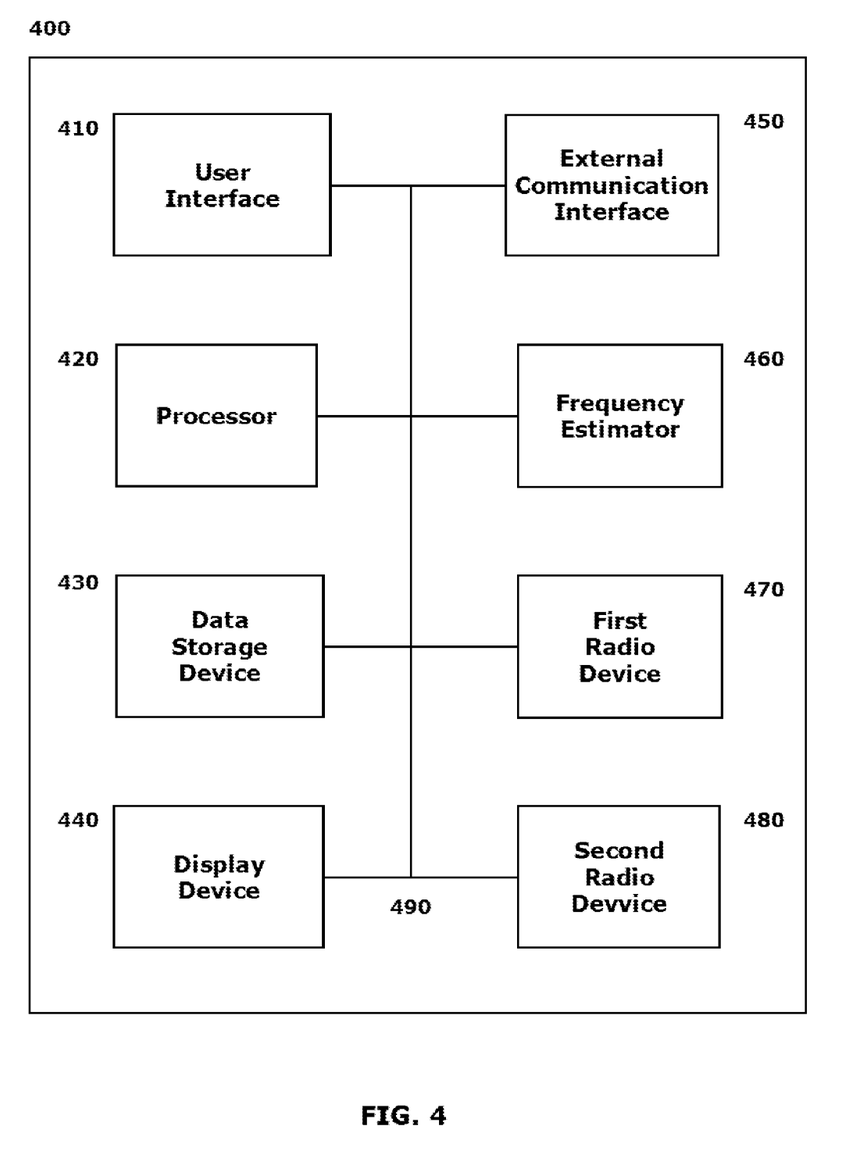
FIG. 4 illustrates a block diagram of an exemplary system for implementing improved frequency estimation for wireless communications according to this disclosure.

FIG. 4 illustrates a block diagram of an exemplary system 400 for implementing improved frequency estimation for wireless communications according to this disclosure.

The exemplary system 400 may include a user interface 410 by which the user can communicate with the exemplary system 400, and initiate operations of the system 400 for frequency estimation. It is recognized that the process of frequency automation may be initiated by operation of one or more radio devices 470,480 that may be included in the exemplary system 400 or with which the exemplary system 400 may be associated. The user interface 410 may be configured as one or more conventional mechanisms that permit a user to input information to the exemplary system 400. The user interface 410 may include, for example, an integral keyboard, or a touchscreen with "soft" buttons for communicating commands and information to the exemplary systems 400. The user interface 410 may alternatively include a microphone by which a user may provide oral commands to the exemplary system 400 to be "translated" by a voice recognition program or otherwise. The user interface 410 may otherwise include any other like device for user operation of, and data exchange with, the exemplary system 400. A user may make inputs via the user interface 410 to simply turn the exemplary system 400, or one or more radios 470, 480 on thereby initiating a communication and frequency estimation process for exemplary system 400.

The exemplary system 400 may include one or more local processors 420 for individually undertaking the processing and control functions that are carried out by the exemplary system 400. Processor(s) 420 may include at least one conventional processor or microprocessor that interprets and executes instructions and processes outgoing and incoming signals via the different communication links, including one or more radios 470,480 associated with the exemplary system 400 to facilitate the detailed frequency estimation algorithm according to the disclosed methods.

The exemplary system 400 may include one or more data storage devices 430. Such data storage device(s) 430 may be used to store data, and operating programs or applications to be used by the exemplary system 400, and specifically the processor(s) 420. Data storage device(s) 430 may include a random access memory (RAM) or another type of dynamic storage device that stores information and instructions for execution by the processor(s) 420. Data storage device(s) 430 may also include a read-only memory (ROM), which may include a conventional ROM device or another type of static storage device that stores static information and instructions for execution by the processor(s) 420. The data storage device(s) 430 will generally be those that are integral to the exemplary system 400. Otherwise, the data storage device(s) 430 may include a remote data storage device external to the exemplary system 400 that is in wireless communication with the exemplary system 400. At least one of the data storage devices should be usable to store the frequency estimation undertaken using the STF in order that it may be used in the disclosed frequency estimation schemes using an LTF with a partially periodic combination of at least four LTS components, as described above.

The exemplary system 400 may include at least one data display device 440, which may be configured as one or more conventional mechanisms that display information to the user of the exemplary system 400 for operation of the exemplary system 400 in its various operating modes, or otherwise for displaying, for example, usable information on a resolved frequency estimate, as may be appropriate.

The exemplary system 400 may include an external data communication interface 450 by which the exemplary system 400 may communicate with component elements of the exemplary system 400 that are not integral to a single device for example that may house most of the other elements of the exemplary system 400.

The exemplary system 400 may include a frequency estimator 460 that is specifically programmed to read and to interpret a partially periodic LTF that may be integrated over an extended period of time in support of deriving a more precise frequency estimate for comparatively lower power or longer range communications, particularly in an IEEE 802.11ah standard system operating in a 1 MHz band. The frequency estimator 460 may aggregate a plurality of frequency estimates derived from non-uniform training sequences.

The exemplary system 400 may include a first radio 470 that is configured to operate according to an IEEE 802.11ah standard including operating in a 1 MHz mode, and may include a second radio that is configured to operate according to another IEEE 802.11 standard. The single algorithm that may be programmed into, and executed by the exemplary system 400 may find equal applicability in operations of the second radio. As such, only one algorithm needs to be programmed into the exemplary system 400 for establishing communications and for distinguishing between transmitters that may be used to effect communications using multiple radios configured to support the different standards. It should be recognized that the use of a single algorithm provides efficiencies in frequency estimation and establishing communications in operating environments in which the exemplary system 400 may be employed to heterogeneously combine communications for radios operating in different frequency bands and according to different standards for establishing WLAN/Wi-Fi communications in the operating environments.

All of the various components of the exemplary system 400, as depicted in FIG. 4, may be connected by one or more data/control busses 490. The data/control bus(ses) 490 may provide internal wired or wireless communication between the various components of the exemplary system 400, as all of those components are housed integrally in the exemplary system 400, or are housed separately and in wired or wireless communication with the exemplary system 400.

It is anticipated that the various disclosed elements of the exemplary system 400 may be arranged in combinations of sub-systems as individual components or combinations of components. All of the depicted components may be integral to a single unit that is exemplary system 400, and includes one or more radios 470,480. Otherwise, individual components or combinations of components may be separately presented and in wired or wireless communication with other of the individual components of the exemplary system 400 or with the one or more radios 470,480. In other words, no specific configuration as an integral unit including radios or as a separate support unit associated with wireless communications using one or more radios for the exemplary system 400 is to be implied by the depiction in FIG. 4.

Figure 5:
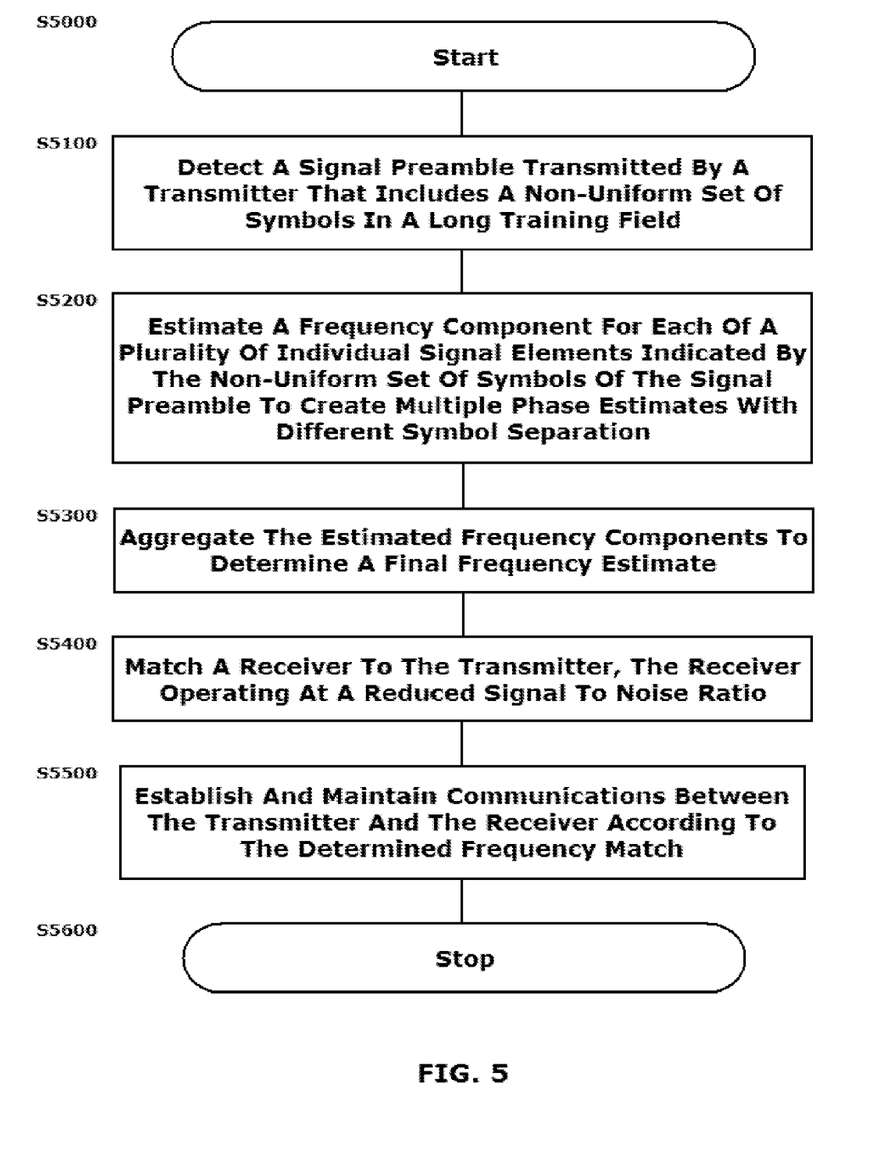
FIG. 5 illustrates a flowchart of an exemplary method for implementing improved frequency estimation for wireless communications according to this disclosure.

The disclosed embodiments include a method for implementing improved frequency estimation for wireless communications. FIG. 5 illustrates a flowchart of such an exemplary method. As shown in FIG. 5, operation of the method commences at Step S5000 and proceeds to Step S5100.

In Step S5100, a signal preamble may be detected that includes a non-uniform set of symbols in the long training field. Operation of the method proceeds to Step S5200.

In Step S5200, a phase component may be isolated for each of the symbols and a frequency component may be determined for each combination of symbols. A frequency component saved from an STF coarse frequency estimation scheme may be applied to at least one of the frequency estimates. One overarching scheme for the disclosed method may compute frequency components according to Equations 4-8 above. Operation of the method proceeds to Step S5300.

In Step S5300, the individual estimated frequency components may be aggregated/averaged to arrive at a determined final frequency estimate. Operation of the method proceeds to Step S5400.

In Step S5400, a receiver may be frequency matched to the transmitter based on the frequency estimate. Operations across the channel to be established may maintain a communication distance for a lower power transmitter, or otherwise may extend a range of available communications while transmitter power is maintained based on the precision of the frequency estimation scheme establishing a higher signal-to-noise ratio at the receiver. Operation of the method proceeds to Step S5500.

In Step S5500, communications may be established and maintained between the transmitter and the receiver according to the determined frequency match. Operation of the method proceeds to Step S5600, where operation of the method ceases.

The disclosed embodiments may include a non-transitory computer-readable medium storing instructions which, when executed by a processor, may cause the processor to execute the steps of a method as outlined above.

The above-described exemplary systems and methods reference certain conventional "known" methods or components to provide a brief, general description of suitable communication and processing environments in which the subject matter of this disclosure may be implemented for familiarity and ease of understanding. Although not required, embodiments of the disclosure may be provided, at least in part, in a form of hardware circuits, firmware or software computer-executable instructions to carry out the specific functions described, including as program modules to be executed by a processor. Generally, program modules include routine programs, objects, components, data structures, and the like that perform particular tasks or implement particular data types.

Those skilled in the art will appreciate that other embodiments of the disclosed subject matter may be practiced in communication network environments with many types of wireless devices, wireless access points, wireless transmitters, and wireless receivers, and many communication equipment and computing system configurations.

Embodiments may also be practiced in distributed network communication environments where tasks are performed by local processing systems and devices, generally as outlined above, some components of which may linked to each other by hardwired links, wireless links, or a combination of the two through a cooperating communication network. In a distributed network environment, program modules, and any stored data or programs, may be located in both local and remote data storage devices.

As indicated briefly above, embodiments according to this disclosure may also include computer-readable media having stored computer-executable instructions or data structures recorded thereon that can be accessed, read and executed by a particular module or device, or system, in, for example, the a mobile or fixed wireless communicating device. Such computer-readable media can be any available media that can be accessed by a processor in, or in communication with, such a wireless device executing a frequency estimation scheme such as that discussed in this disclosure. By way of example, and not limitation, such computer-readable media can comprise RAM, ROM, EEPROM, CD-ROM, DVD-ROM, flash drives, thumb drives, data memory cards or other analog or digital data storage devices that can be used to carry or store desired program elements or steps in the form of accessible computer-executable instructions or data structures. When information is transferred or provided over a network or another communications connection the receiving processor properly views the connection as a computer-readable medium. Thus, any such connection is properly termed a computer-readable medium. Combinations of the above should also be included within the scope of the computer-readable media for the purposes of this disclosure.

Computer-executable instructions include, for example, non-transitory instructions and data that can be executed and accessed respectively to cause wireless communicating components, or processors associated with such components, to perform certain of the above-specified functions, individually or in combination. Computer-executable instructions also include program modules that are remotely stored for access by a wireless device or system to be executed by processors in the wireless device or system when the wireless device or system is caused to communicate across any available communication link, particularly those described in exemplary manner above.

The exemplary depicted sequence of executable instructions, or associated data structures for executing those instructions, represents one example of a corresponding sequence of acts for implementing the functions described in the steps. The steps of the method, as depicted, are not intended to imply that all of the depicted and described steps must be executed as part of the method, or that the steps need to be executed in any particular order, except as may be necessarily inferred when one of the depicted steps is a necessary precedential condition to accomplishing another of the depicted steps. The depicted steps may be executed in series or in parallel, as applicable.

Although the above description may contain specific details, they should not be construed as limiting the claims in any way. Other configurations of the described embodiments of the disclosed systems and methods are part of the scope of this disclosure. For example, the principles of the disclosure may be applied to each individual wireless device where each individual wireless device may individually and independently operate according to the disclosed system constraints or method steps. This enables each user of a wireless device to use the benefits of the disclosure even if any one of the large number of possible applications do not need a specific aspect of the functionality described and depicted in this disclosure. In other words, there may be multiple instances of the separate wireless devices each processing the content in various possible ways to establish the disclosed frequency estimation. It does not necessarily need to be one system used by all end users or undertaken identically by each wireless device or system. Accordingly, the appended claims and their legal equivalents should only define the disclosure, rather than any specific examples given.

We claim:

1. A wireless communication system, comprising:
    a receiving device that receives a wireless signal including a packet preamble structure having a partially periodic training component; and
    a frequency estimator that computes a plurality of component frequency estimates according to portions of the partially periodic training component, that aggregates the plurality of component frequency estimates to determine an overall frequency estimate for the received wireless signal, and that adjusts the receiving device according to the overall frequency estimate;
    wherein the frequency estimator computes at least one of the plurality of component frequency estimates by using portions of a guard interval (GI) from the partially periodic training component;
    wherein the frequency estimator computes at least one of the plurality of component frequency estimates by using phase data associated with a preliminary coarse frequency estimation using a short training field (STF);
    wherein the partially periodic training component is a long training field (LTF) consisting of four symbols;
    wherein the four symbols comprise two symbols that are together constituted of a double guard interval (DGI) and a pair of long training sequences (PLTS) and two symbols that are each constituted of a single guard interval (GI) followed by a long training sequence (LTS);
    wherein the frequency estimator computes the plurality of component frequency estimates based on phase detector outputs for varying combinations of the long training sequences (LTS);
    wherein a first frequency estimate of the plurality of component frequency estimates includes a phase detector output using the pair of long training sequences (PLTS) in addition to a phase detector output of the STF used in the preliminary coarse frequency estimation.

2. The system of claim 1, wherein the frequency estimator is programmed to read and to interpret a partially periodic LTF that may be integrated over an extended period of time.

3. The system of claim 2, wherein the frequency estimator aggregates the plurality of frequency estimates derived from non-uniform training sequences and wherein the short training field (STF) consists of four symbols.

4. The system of claim 1, the short training field (STF) consisting of four symbols.

5. The system of claim 1, the packet preamble structure being according to an IEEE 802.11ah standard.

6. The system of claim 5, the wireless signal being received from a transmitter using a 1 MHz bandwidth.

7. The system of claim 5, the wireless signal being received from a transmitter associated with one or more sensors for wirelessly transmitting information from the one or more sensors to a receiver.

8. A method for estimating a frequency of a received wireless signal, comprising:
    receiving the wireless signal;
    determining that a packet preamble structure in the received wireless signal has a partially periodic training component;
    computing, with a processor, a plurality of separate component frequency estimates according to portions of the partially periodic training component;
    aggregating, with the processor, the plurality of component frequency estimates to determine an overall frequency estimate for the received wireless signal; and
    adjusting a receiving device according to the overall frequency estimate;
    performing, with the processor, a preliminary coarse frequency estimation prior to the computing, the aggregating and the adjusting;
    wherein the plurality of separate component frequency estimates is computed by using portions of a guard interval (GI) from the partially periodic training component;
    wherein at least one of the plurality of separate component frequency estimates is computed by using phase data associated with the preliminary coarse frequency estimation using a short training field (STF);
    wherein a first frequency estimate of the plurality of separate component frequency estimates includes a phase detector output using a pair of long training sequences (PLTS) in addition to a phase detector output of the STF used in the preliminary coarse frequency estimation.

9. The method of claim 8, the partially periodic training component being a long training field (LTF) consisting of four symbols.

10. The method of claim 9, the four symbols comprising two symbols that are together constituted of a double guard interval (DGI) and a pair of long training sequences (PLTS) and two symbols that are each constituted of a single guard interval (GI) followed by a long training sequence.

11. The method of claim 10, the plurality of component frequency estimates being computed based on phase detector outputs for varying combinations of the long training sequences.

12. The method of claim 8, wherein the processor is programmed to read and to interpret a partially periodic LTF that may be integrated over an extended period of time.

13. The method of claim 12, wherein the processor aggregates the plurality of frequency estimates derived from non-uniform training sequences.

14. The method of claim 8, further comprising storing phase data associated with the short training field.

15. The method of claim 14, at least one of the plurality of component frequency estimates being computed by referencing the stored phase data associated with the short training field.

16. The method of claim 15, the short training field consisting of four symbols.

17. The method of claim 8, the packet preamble structure being according to an IEEE 802.11ah standard.

18. The method of claim 17, the wireless signal being received from a transmitter using a 1 MHz bandwidth.

19. The method of claim 17, the wireless signal being received from a transmitter associated with one or more sensors for wirelessly transmitting information from the one or more sensors to the receiving device.

20. The method of claim 19, further comprising at least one of establishing and maintaining wireless communications between the transmitter and the receiving device for transmitting the information from the one or more sensors to the receiving device.

21. A non-transitory computer-readable medium storing computer-readable instructions which, when executed by a processor, causes the processor to execute a method for estimating a frequency of a received wireless signal, comprising:
    receiving the wireless signal;
    determining that a packet preamble structure in the received wireless signal has a partially periodic training component;
    computing a plurality of separate component frequency estimates according to portions of the partially periodic training component;

aggregating the plurality of component frequency estimates to determine an overall frequency estimate for the received wireless signal;
adjusting a receiving device according to the overall frequency estimate; and
performing a preliminary coarse frequency estimation prior to the computing, the aggregating and the adjusting;
wherein the plurality of separate component frequency estimates is computed by using portions of a guard interval from the partially periodic training component;
wherein at least one of the plurality of separate component frequency estimates is computed by using phase data associated with the preliminary coarse frequency estimation using a short training field (STF);
wherein a first frequency estimate of the plurality of separate component frequency estimates includes a phase detector output using a pair of long training sequences (PLTS) in addition to the phase detector output of the STF used in the preliminary coarse frequency estimation.

22. The non-transitory computer-readable medium of claim 21, the partially periodic training component being a long training field (LTF) consisting of four symbols.

23. The non-transitory computer-readable medium of claim 22, the four symbols comprising two symbols that are together constituted of a double guard interval and a pair of long training sequences and two symbols that are each constituted of a single guard interval and a long training sequence.

24. The non-transitory computer-readable medium of claim 23, the plurality of component frequency estimates being computed based on phase detector outputs for varying combinations of the long training sequences.

25. The non-transitory computer-readable medium of claim 21, further comprising programming the processor to read and to interpret a partially periodic LTF that may be integrated over an extended period of time.

26. The non-transitory computer-readable medium of claim 25, wherein the processor aggregates the plurality of frequency estimates derived from non-uniform training sequences.

27. The non-transitory computer-readable medium of claim 26, further comprising storing phase data associated with the short training field.

28. The non-transitory computer-readable medium of claim 27, at least one of the plurality of component frequency estimates being computed by referencing the stored phase data associated with the short training field.

29. The non-transitory computer-readable medium of claim 28, the short training field consisting of four symbols.

30. The non-transitory computer-readable medium of claim 21, the packet preamble structure being according to an IEEE 802.11ah standard.

31. The non-transitory computer-readable medium of claim 30, the wireless signal being received from a transmitter using a 1 MHz bandwidth.

32. The non-transitory computer-readable medium of claim 30, the wireless signal being received from a transmitter associated with one or more sensors for wirelessly transmitting information from the one or more sensors to the receiving device.

33. The non-transitory computer-readable medium of claim 32, further comprising at least one of establishing and maintaining wireless communications between the transmitter and the receiving device for transmitting the information from the one or more sensors to the receiving device.

* * * * *